Oct. 24, 1939.   R. L. CAMPBELL   2,176,886
MEASURING RAINFALL
Filed Nov. 9, 1937   2 Sheets-Sheet 2

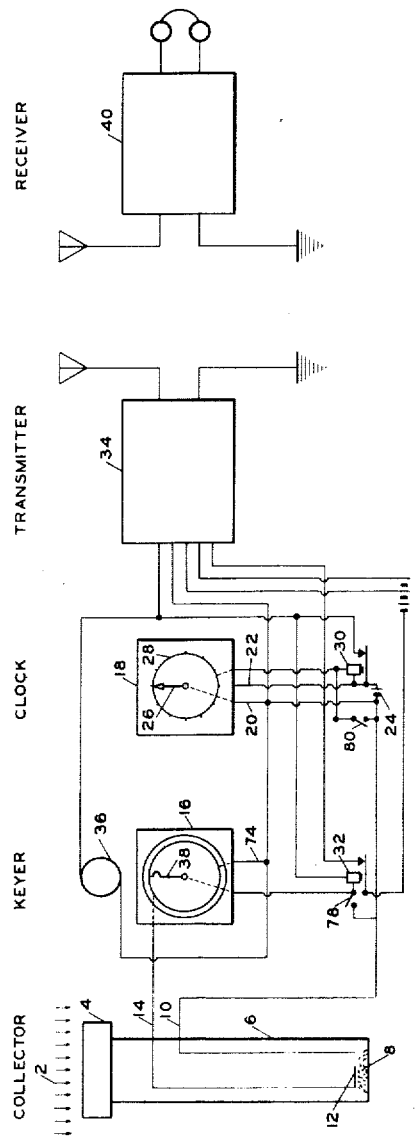

*Roy Lynn Campbell*
INVENTOR

BY *Arthur L. Davis*
ATTORNEY

Patented Oct. 24, 1939

2,176,886

UNITED STATES PATENT OFFICE 2,176,886

MEASURING RAINFALL

Roy Lynn Campbell, Knoxville, Tenn.

Application November 9, 1937, Serial No. 173,631

4 Claims. (Cl. 73—151)

(Granted under the act of March 3, 1883, as amended April 30, 1928; 370 O. G. 757)

The invention herein described may be manufactured and used by or for the Government for governmental purposes without the payment to me of any royalty thereon.

This invention relates to an apparatus for indicating liquid levels, particularly in respect to measuring rainfall.

The principal object of this invention is to indicate a liquid level at one location and to transmit the level so indicated to a distant location. Another object of this invention is to provide a mechanism to transmit the various signals indicating a liquid level by the use of a plurality of electrical circuits. Another object of this invention is to provide a mechanism for indicating and transmitting the indication of varying liquid levels to a distant location by the use of a single source of energy. Another object of this invention is to provide an apparatus for transmitting an indication of liquid level to a distant location at predetermined intervals. Another object of this invention is to provide an apparatus for transmitting the liquid level indicated at one location to another location at predetermined intervals, in which the indication of the liquid level transmitted is preceded by the call letters identifying the station supplying the indication.

I have also discovered an apparatus for measuring the depth of a liquid at one location and transmitting the indication to a distant location, which includes the combination of a container for the liquid, with a vertical electrical conducting element throughout the length of the container; a contact rack within the container with a plurality of contact elements vertically spaced on the rack; a keyer having a keyer motor driving a revolving keyer arm which successively contacts a plurality of keyer contact elements corresponding in number to the container contact elements; an electrical conductor between each container contact element and a respective keyer contact element; an electrical current supply to the keyer motor; an electrical conductor between the keyer arm and the electrical current supply; an electrical conductor between the container conducting element and the electrical current supply; an intelligence transmitting circuit; an electrical current supply circuit for the transmitting circuit; a relay in the circuit closed by the keyer contact elements for closing the electrical current supply for the transmitting circuit; and a receiver for intercepting the signals emitted by the transmitting circuit when the keyer arm revolves and the relay closes successively on contact of the keyer arm and the respective keyer contact elements.

In the accompanying drawings, which form a part of the specification, and wherein reference symbols refer to like parts wherever they occur, Fig. 1 is a diagrammatic view of one form of apparatus for the embodiment of my invention.

Figure 3:
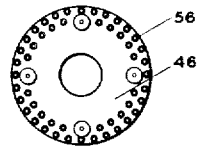
Fig. 3 is a plan view of the collector contact rack.

In Fig. 1, the rainfall 2, falls into a United States Weather Bureau rain receiver 4, mounted on top of a collector 6, and is guided to the center of the collector and through a tube into the bottom of the collector 6. The rain in the bottom of the collector forms a solution of an electrolyte 8, which serves as a conductor and closes the circuit, when energized, between the electrical conductor 10, and the plurality of individually connected contacts represented by contact 12, connected by the cable 14, to the keyer 16. A solenoid wound clock 18, energized by conductors 20 and 22, from a power supply 24, turns on the apparatus at predetermined times when the hand 26, moves on one of the plurality of contacts represented by contact 28, thereby energizing the master relay 30, which energizes simultaneously the circuit for the transmitter 34, the keyer 16, and the keyer motor 36. The keyer 16, operated by the keyer motor 36, from the power supply 24, revolves the keyer arm 38, clockwise, alternately closing and opening the circuit to the relay 32, and thereby conveying electrical impulses corresponding to the identification of the station and the liquid level indication to transmitter 34. The electrical impulses from the transmitter 34, are intercepted by a receiver 40.

Figure 2:
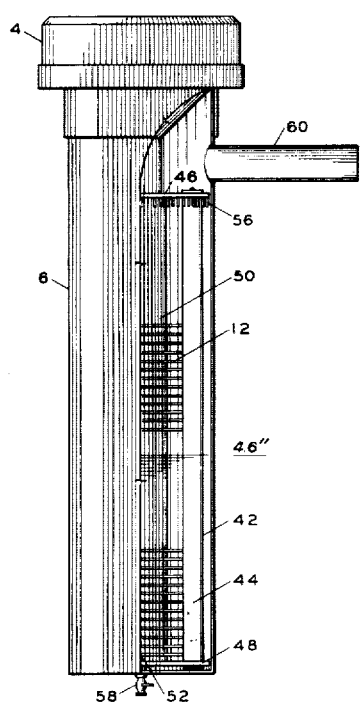
Fig. 2 is a vertical front view of the collector with a portion of the shell omitted to show the contact rack therein.
Figure 4:
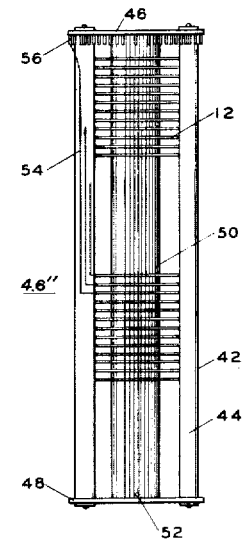
Fig. 4 is a vertical side view of the collector rack.

In Figs. 1, 2, 3, and 4, the collector 6 consists of an United States Weather Bureau receiver 4, mounted on top of the collector with the receiver provided with a funnel which guides the rain into the center of the collector contact rack 42, and through a tube into the bottom of the collector. The contact rack 42 consists of 4 insulating posts 44, provided with a top insulating plate 46, and a bottom insulating plate 48. The insulating posts support a plurality of cross bar contacts represented by contact 12, which are thereby insulated from each other. In the center of the contact rack 42, a combination electrical conductor and tube 50, connected to electrical conductor 10, is provided to keep the water collected from coming in contact with the upper contacts of the assembly and thereby short circuiting them. In the bottom of the tube 50, a plurality of appertures represented by aperture 52, is provided to allow the rain collected to flow out of the tube into the bottom of the collector 6, thereby facilitating the agitation with electrolyte 8, in the formation of a solution of the same. Each of the contacts, represented by contact 12, is connected through a conductor, represented by conductor 54, to a tip jack represented by tip jack 56. The bottom of the collector 6, is provided with a valve 58, for use in periodic drain of the collector. A conduit 60 is provided in the side of the collector 6, to house the plurality of conductors, represented by cable 14, which are connected to the keyer 16.

Figure 5:
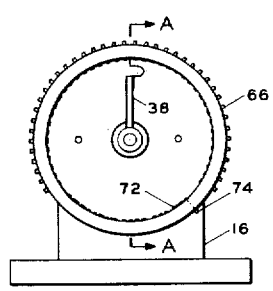
Fig. 5 is a vertical view of the keyer.
Figure 6:
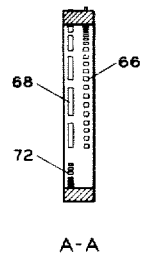
Fig. 6 is a vertical sectional view through the dial of the keyer as shown in Section A—A, Fig. 5.
Figure 7:
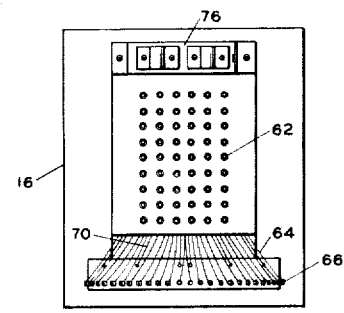
Fig. 7 is a plan view of the keyer.

In Figs. 1, 5, 6, and 7, the plurality of conductors, represented by cable 14, from the collector 6, are connected to a plurality of tip jacks represented by tip jack 62 on the top of the keyer 16. The plurality of tip jacks, represented by tip jack 62, are connected by a plurality of conductors, represented by conductor 64, to a plurality of contact points located on the rim of the keyer dial, represented by contact point 66. A plurality of shorting bars, represented by shorting bar 68, are each connected by a conductor, represented by conductor 70, to a tip jack, represented by tip jack 62, which corresponds to an integral unit of measurement of the indication. These shorting bars are provided to cause a short circuit for the respective fractional portion of the indication, thereby causing each individual inch reading to be transmitted as a long dash. The revolving keyer arm 38, driven by keyer motor 36, moving in a clockwise direction around the keyer dial, makes successive contact with a plurality of contacts represented by contact 72, of widths so arranged to create electrical impulses which transmit the call letters of the station in dots and dashes. This plurality of contacts, connected by conductor 74, completes the circuit so that the call letters will be transmitted periodically each time the circuit is energized independent of the operation of the collector circuit. The keyer arm 38, continuing its clockwise revolution around the keyer dial, makes contact with the plurality of contact points, represented by contact point 66, and shorting bars 68, in turn creating electrical impulses which transmit the reading of liquid level in the collector in inches and two-tenths of inches of rainfall respectively. The supporting bracket 76; supports a plurality of conductors, represented by cable 14, and holds the latter securely in place at the top of the keyer 16, adjacent to the plurality of tip jacks represented by tip jack 62. A switch 78, and a switch 80, are provided in the circuit for manual operation of the station during inspection periods.

One example of the operation of my invention is given using the apparatus described above. When the hour hand of the timer moves to the next successive contact therein, the relay 30, is energized, closing the circuit for energizing the transmitter 34, and the keyer motor 36. As the keyer motor rotates the keyer arm 38, the latter contacts successively, all of the station call letter contacts 72, and all of the liquid level indication contacts 12, which correspond to the total range of predetermined liquid levels and the shorting bars 68. The signals transmitted successively for the call letters of the station WSHJ1, in American Morse code, and the liquid level indication of 4.6" as shown in the drawings are as follows:

$$\cdot -\!\!\!-\!\!\!- \underset{W}{p} \cdot \cdot \cdot \underset{S}{p} \cdot \cdot \cdot \underset{H}{p} -\!\cdot\!-\cdot \underset{J}{p} \cdot -\!\!\!-\cdot \underset{1}{p} -\!\!\!- \underset{4''}{\quad} -\!\!\!- \underset{.6''}{\quad} -\!\!\text{pppppppppppppppppppppp}$$

With · representing a dot, with — representing a dash in the call letters or 0.2" in the indication, —— representing an integral inch in the indication, and with p representing a pause between the signals representing the respective letters and numbers. This series of signals is repeated a predetermined number of times, sufficient for the receiver to accurately identify the signals transmitted.

A second example of the signals transmitted successively for a liquid level indication of 0.6" is as follows:

$$\cdot -\!\!\!-\!\!\!- \underset{W}{p} \cdot \cdot \cdot \underset{S}{p} \cdot \cdot \cdot \underset{H}{p} -\!\cdot\!-\cdot \underset{J}{p} \cdot -\!\!\!-\cdot \underset{1}{p} -\!\!\!- \underset{0.6''}{\quad} -\!\!\text{ppppppppppppppppppppppppppppppppp}$$

A third example of the signals transmitted successively for a liquid level indication of exactly 4.0" is as follows:

$$\cdot -\!\!\!-\!\!\!- \underset{W}{p} \cdot \cdot \cdot \underset{S}{p} \cdot \cdot \cdot \underset{H}{p} -\!\cdot\!-\cdot \underset{J}{p} \cdot -\!\!\!-\cdot \underset{1}{p} -\!\!\!- \underset{4.0''}{\quad} -\!\!\text{pppppppppppppppppppppp}$$

It is evident that there are numerous factors which will influence conditions for the most satisfactory operation of my invention, the actual limitations of which cannot be established except by a detailed study of each set of conditions under which this invention is to be operated.

The liquid level indication may be obtained in any suitable container. This container may be a storage tank holding the liquid or as in the case of rainfall it may be a collector in which the liquid falling on any specified area is accumulated. In measuring rainfall it has been found convenient to use a standard United States Weather Bureau receiver for this purpose.

Within the collector, receiver or container, is placed a series of contact elements at predetermined elevations with each of the contact elements connected with an electrical conductor which extends outside the collector receiver or container. The contact elements are electrically insulated from each other. An electrical conductor is placed adjacent to the contact elements but separated from the latter by some of the liquid, the depth of which is being measured. The collector, receiver or container, carrying the contact elements, their supports and other elements of the assembly, are calibrated to assure that each of the contact elements is located at a known elevation.

The liquid being measured generally contains an electrolyte or at least has sufficient electrical conductivity to permit the closing of an electrical circuit between the conductor and any one of the contact elements.

The keyer may be of any suitable mechanism for assisting in the completion of the circuit from the collector receiver or container, to a transmitting apparatus. It is provided with a keyer arm, which, when rotated by suitable means, contacts successively elements which correspond to predetermined heights of liquid level. The keyer is provided with additional contacts which correspond to the call letters of the station in code, with the arrangement such that the call letters precede the transmission of indication of liquid level.

It is obvious that with continuous rotation of the keyer arm at a predetermined rate, a substantially continuous set of indications of liquid level could be transmitted. However, for practical purposes including economy, it is only necessary to transmit such indications at predetermined intervals. This is readily accomplished by the use of a timer which contains a plurality of contact elements, each of which is set to correspond to a time at which a series of indications of liquid level are to be transmitted. The timer is also so connected that at the time of making such contact a transmitter is energized and the keyer is energized, that is the motor operating the keyer is operated so that the successive series of call letter code and liquid level indications are sent for a sufficient length of time for them to be received and recorded accurately.

When power lines or lines for communication of intelligence, are adjacent to the transmitting station, direct current or alternating current of suitable frequency may be used.

When the keyer arm contacts a keyer contact element a circuit through the keyer is closed operating a relay in series with the transmitter, thereby transmitting the signal through the transmitter to the distant point which corresponds to the length and location of the contact on the keyer. The transmitter used will depend upon the accessibility of the station from which the original indication is made, the distance through which the signal is to be transmitted, and the character of power facilities adjacent to both the former and the latter. Where the transmitting station is at a relatively inaccessible point, it is preferable to use a short wave radio frequency transmitter with a self contained portable power supply such as a storage battery or storage batteries.

The receiver used will, of course, correspond to the means in which the indications are transmitted. Since all the indications, both of the call letters of the station, and the indication of liquid level, are transmitted in code, it is necessary to translate these readings in accordance with the predetermined code used so the indications may be available for ordinary use.

It will be seen, therefore, that this invention actually may be carried out by the use of various modifications and changes without departing from its spirit and scope, with only such limitations placed thereon as are imposed by the prior art.

I claim:

1. In an apparatus for measuring the depth of rainfall at one location and transmitting the measurement to a distant location, the combination which comprises a collector for the rainfall with a vertical electrical conducting element throughout the length of the collector; a contact rack within the collector with a plurality of contact elements vertically spaced on the rack; a keyer having a keyer motor driving a revolving keyer arm which successively contacts a plurality of keyer contact elements corresponding in number to the collector contact elements; an electrical conductor between each collector contact element and a respective keyer contact element; an electric clock with a plurality of contact elements, closing an electrical circuit at predetermined intervals, and electrically connected to a direct current supply for operating the clock and energizing the circuit when closed by contact elements; an electrical conductor between the clock contact elements and the keyer motor; an intelligence transmitting circuit; a radio transmitter in the intelligence transmitting circuit; a direct current supply circuit for the transmitter, an electrical conductor between the transmitter and the electric clock contacts whereby the transmitter is energized at predetermined intervals; a relay in the circuit closed by the keyer contact elements for closing the direct current supply circuit for the transmitter; an electrical conductor between the collector conducting element and the direct current supply; and a radio receiver for intercepting the signals emitted by the transmitted when the electric clock contacts close the circuit to the keyer motor, the keyer arm revolves and the relay closes successively on contact of the keyer arm with the respective keyer contact elements.

2. In an apparatus for measuring the depth of rainfall at one location and transmitting the measurement to a distant location, the combination which comprises a collector for the rainfall with a vertical electrical conducting element throughout the length of the collector; a contact rack within the collector with a plurality of contact elements vertically spaced on the rack; a keyer having a keyer motor driving a revolving keyer arm which successively contacts a plurality of keyer contact elements corresponding in number to the collector contact elements; an electrical conductor between each collector contact element and a respective keyer contact element; an electric clock with a plurality of contact elements, closing an electrical circuit at predetermined intervals, and electrically connected to an electrical current supply for operating the clock and energizing a circuit when closed by contact elements; an electrical conductor between the clock contact elements and the keyer motor; an intelligence transmitting circuit; an electrical supply circuit for the transmitting circuit; an electrical conductor between the transmitting circuit and the electric clock contacts whereby the transmitting circuit is energized at predetermined intervals; a relay in the circuit closed by the keyer contact elements for closing the electrical current supply circuit for the transmitting circuit; an electrical conductor between the electrical conducting element and the electrical current supply; and a receiver for intercepting the signals emitted by the transmitting circuit when the electric clock contacts close the circuit to the keyer motor, the keyer arm revolves and the relay closes successively on contact of the keyer arm with the respective keyer contact elements.

3. In an apparatus for measuring the depth of rainfall at one location and transmitting the measurement to a distant location, the combination which comprises a collector for the rainfall with a vertical electrical conducting element throughout the length of the collector; a contact rack within the collector with a plurality of contact elements vertically spaced on the rack; a keyer having a keyer motor driving a revolving keyer arm which successively contacts a plurality of keyer contact elements corresponding in number to the collector contact elements; an electrical conductor between each collector contact element and a respective keyer contact element; a direct current supply to the keyer motor; an electrical conductor between the keyer arm and the direct current supply; an electrical conductor between the collector conducting element and the direct current supply; an intelligence transmitting circuit; a direct current supply circuit for the transmitting circuit; a relay in the circuit closed by the keyer contact elements for closing the direct current supply for the transmitting circuit; and a receiver for intercepting the signals emitted by the direct current transmitting circuit when the keyer arm revolves and the relay closes successively on contact of the keyer arm with the respective keyer contact elements.

4. In an apparatus for measuring the depth of a liquid at one location and transmitting the measurement to a distant location, the combination which comprises a container for the liquid, with a vertical electrical conducting element throughout the length of the container; a contact rack within the container, with a plurality of contact elements vertically spaced on the rack; a keyer having a keyer motor driving a revolving keyer arm which successively contacts a plurality of keyer contact elements corresponding in number to the container contact elements; an electrical conductor between each container contact element and a respective keyer contact element; an electrical current supply to the keyer motor; an electrical conductor between the keyer arm and the electrical current supply; an electrical conductor between the container conducting element and the electrical current supply; an intelligence transmitting circuit; an electrical current supply circuit for the transmitting circuit; a relay in the circuit closed by the keyer contact elements for closing the electrical current supply for the transmitting circuit; and a receiver for intercepting the signals emitted by the transmitting circuit when the keyer arm revolves and the relay closes successively on contact of the keyer arm and the respective keyer contact elements.

ROY LYNN CAMPBELL.

CERTIFICATE OF CORRECTION.

Patent No. 2,176,886.　　　　　　　　　　　　　October 24, 1939.

ROY LYNN CAMPBELL.

It is hereby certified that error appears in the printed specification of the above numbered patent requiring correction as follows: Page 3, second column, line 19, claim 1, for the word "transmitted" read transmitter; and that the said Letters Patent should be read with this correction therein that the same may conform to the record of the case in the Patent Office.

Signed and sealed this 21st day of November, A. D. 1939.

(Seal)　　　　　　　　　　　　　　　　　　Henry Van Arsdale,
　　　　　　　　　　　　　　　　　　　　Acting Commissioner of Patents.

conductor between the keyer arm and the direct current supply; an electrical conductor between the collector conducting element and the direct current supply; an intelligence transmitting circuit; a direct current supply circuit for the transmitting circuit; a relay in the circuit closed by the keyer contact elements for closing the direct current supply for the transmitting circuit; and a receiver for intercepting the signals emitted by the direct current transmitting circuit when the keyer arm revolves and the relay closes successively on contact of the keyer arm with the respective keyer contact elements.

4. In an apparatus for measuring the depth of a liquid at one location and transmitting the measurement to a distant location, the combination which comprises a container for the liquid, with a vertical electrical conducting element throughout the length of the container; a contact rack within the container, with a plurality of contact elements vertically spaced on the rack; a keyer having a keyer motor driving a revolving keyer arm which successively contacts a plurality of keyer contact elements corresponding in number to the container contact elements; an electrical conductor between each container contact element and a respective keyer contact element; an electrical current supply to the keyer motor; an electrical conductor between the keyer arm and the electrical current supply; an electrical conductor between the container conducting element and the electrical current supply; an intelligence transmitting circuit; an electrical current supply circuit for the transmitting circuit; a relay in the circuit closed by the keyer contact elements for closing the electrical current supply for the transmitting circuit; and a receiver for intercepting the signals emitted by the transmitting circuit when the keyer arm revolves and the relay closes successively on contact of the keyer arm and the respective keyer contact elements.

ROY LYNN CAMPBELL.

CERTIFICATE OF CORRECTION.

Patent No. 2,176,886.  October 24, 1939.

ROY LYNN CAMPBELL.

It is hereby certified that error appears in the printed specification of the above numbered patent requiring correction as follows: Page 3, second column, line 19, claim 1, for the word "transmitted" read transmitter; and that the said Letters Patent should be read with this correction therein that the same may conform to the record of the case in the Patent Office.

Signed and sealed this 21st day of November, A. D. 1939.

(Seal)

Henry Van Arsdale,
Acting Commissioner of Patents.